United States Patent Office 3,455,962
Patented July 15, 1969

3,455,962
CATALYTIC FLUID BED OXIDATION OF o-XYLENE TO PHTHALIC ANHYDRIDE
Robert B. Egbert, Stamford, and Thomas J. Gluodenis, Waterbury, Conn., assignors to Chemical Process Corporation, Stamford, Conn., a corporation of Massachusetts
Filed Sept. 3, 1965, Ser. No. 484,807
Int. Cl. C07d 5/00, 5/32; C07c 51/16
U.S. Cl. 260—346.4                                9 Claims

ABSTRACT OF THE DISCLOSURE

Vapor phase, catalytic, fluid bed, air oxidation of o-xylene to phthalic anhydride, in which a volatile metal polyalkyl is present in the vapor state to suppress oxidation and rupture of the aromatic ring and thereby increase yield and selectivity. Also the metal polyalkyl permits the use of higher temperatures which further increases yield and selectivity. Preferably, a bromine compound, such as HBr, is also present in the vapor state to promote the oxidation of the methyl carbons to phthalic anhydride and thereby further increase yield and selectivity.

---

Figure 1:
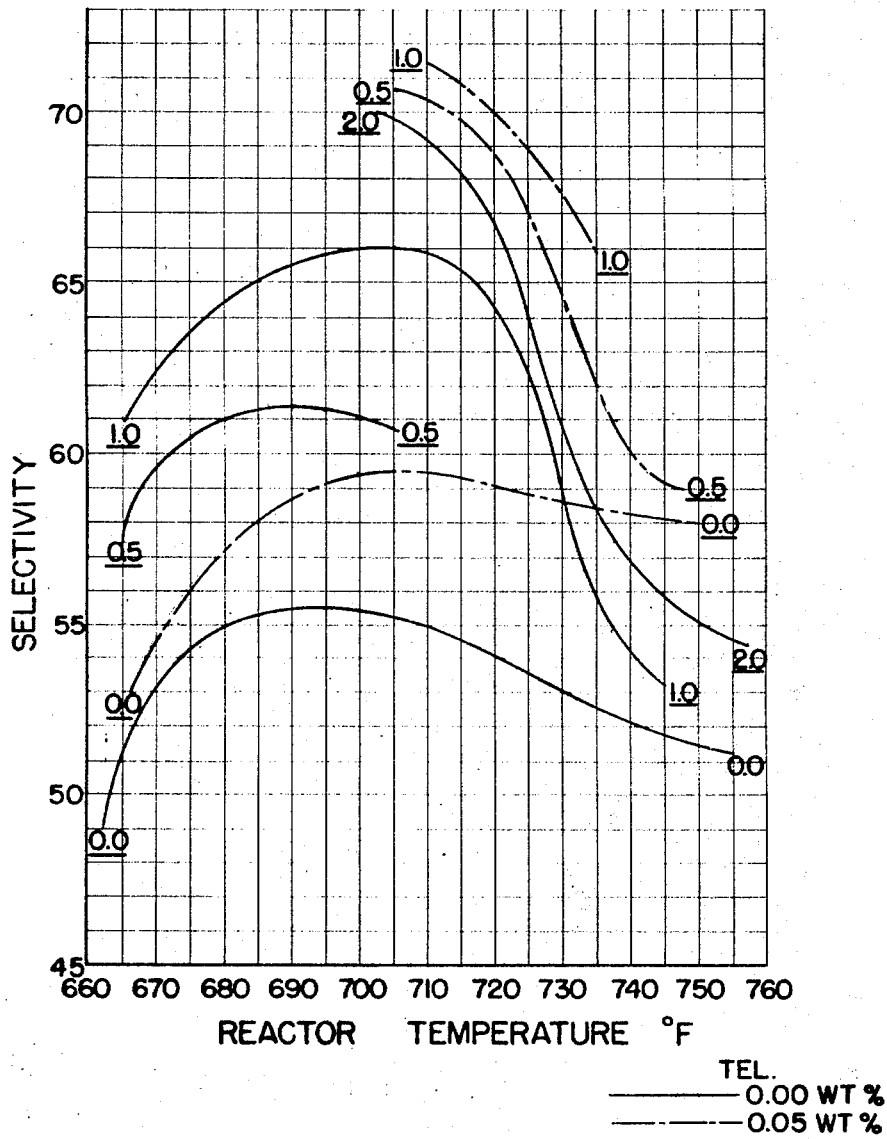

The present invention relates to a process for the vapor phase, catalytic oxidation of o-xylene to phthalic anhydride (referred to herein as PAA) with an oxygen containing gas, particularly air, in a fluidized catalytic bed.

A basic problem inherent in this process is that under reactor conditions required for reasonable conversion of the o-xylene to PAA, which is achieved by selective oxidation of the alkyl groups of the o-xylene, there is an undesired competing oxidation and severance of the benzene ring to form CO, $CO_2$ and maleic anhydride at the expense of PAA yield and selectivity. Yield may be defined as lbs. of PAA per 100 lbs. of o-xylene in the feed. Selectivity may be defined as the ratio of oxidized o-xylene, in which the methyl carbon or carbons of the o-xylene have been wholly or partially oxidized but neither of them removed but in which the benzene ring remains intact, to the total o-xylene converted.

The rate of this competing reaction, as compared to the rate of oxidation of the alkyl groups, may be reduced by lowering the reaction temperature but this has the undesired effects of (1) increasing the amount of undesired partial oxidation products in the product gas, such as phthalide, ortho-toluic acid, orthotolualdehyde, etc., to thereby decrease yield and (2) undesirably lowering the desired reaction rate to thereby lower the catalyst loading rate, i.e., feed per hour per lb. catalyst. Although the increase in the aforesaid partial oxidation products by reducing the reactor temperature, does not affect selectivity, it does reduce yield, as aforesaid.

It has been discovered that one way of increasing yield and selectivity is to carry out the reaction in the presence in the vapor phase of a bromine promotor in the form of elemental bromine, HBr, or a bromine compound capable of dissociation into elemental bromine or HBr at reactor temperature. The bromine promoter is effective to selectively activate the methyl carbons to thereby increase the rate of selective oxidation thereof compared to the rate of oxidation of the benzene ring. Consequently, both selectivity and yield of PAA are increased. The aforesaid activation of the methyl carbons permits the use of lower reaction temperatures without the formation of large amounts of the aforesaid undesired partial oxidation products. By permitting lower reaction temperatures, the rate of oxidation of the ring carbons is lowered to thereby further increase yield and selectivity.

On the other hand, the methyl carbons are oxidized at a rapid rate at the lower temperatures due to the activation thereof by the bromine promoter.

The present invention provides a process for the vapor phase, fluid bed catalytic oxidation of o-xylene to PAA by an oxygen containing gas, in which PAA yields and selectivities can be substantially increased without the use of bromine promoters, and in which PAA yields and selectivities achieved with bromine promoters can be increased substantially at reduced cost and at increased rates of reaction of the process.

This is achieved in accordance with the present invention by carrying out the reaction in the presence in the vapor phase of a volatile metal compound selected from the group consisting of a metal polyalkyl, a metal polyaryl, a metal polyalkylaryl (i.e., containing both aryl and akyl groups bonded to the metal), a metal polycarbonyl and a metal polycyclopentadienyl, in which the metal of the metal polyalkyl, polyaryl and poyalkylaryl is a metal selected from the group consisting of lead, bismuth, selenium, tellurium and tin, in which the metal of the metal polycarbonyl is selected from the group consisting of iron and nickel, in which the metal of the metal polycyclopentadienyl is selected from the group consisting of manganese, nickel and iron and in which the alkyl is a lower alkyl containing no more than 5 carbon atoms. The metals which can be used in each case are limited to those which are capable of forming these organo compounds. Those metals which will do this are well known and are polyvalent in oxide form. A highly preferred metal compound is lead tetraethyl (referred to as TEL).

The metal compounds must be volatile under reactor conditions in the quantity used. They also must be stable enough to permit storage, feeding and metering but capable of being decomposed under reactor conditions into active metal atoms and active organo radicals which function as oxidation reaction chain terminators. These and related compounds fall within the broader class of anti-knock compounds whose purpose is to prevent premature detonation in internal combustion engines. However, this is not their function in the present invention. Their function in the present invention is to inhibit oxidation of the ring carbons whereas in internal combustion engines, the purpose is to achieve complete oxidation to CO and $CO_2$. Thus, it may be stated that any polyvalent metal polyalkyl, polyaryl, polyalkylaryl, polycarbonyl and polycyclopentadienyl which falls with the known class of anti-knock compounds can be used in the present invention.

It is believed that the metal compounds of this invention function to selectively suppress or inhibit the rate of vapor phase oxidation of the ring carbons of the o-xylene, as distinguished from the methyl carbons thereof, by selectively reducing the activity of such ring carbons to thereby increase yield and selectivity substantially. By doing this, a higher reaction temperature can be used without unduly increasing the rate of vapor phase oxidation of the ring carbons to thereby increase the rate of oxidation of the methyl carbons and decrease the amount of undesired partial oxidation products, whereby yield and selectivity are increased. By increasing the rate of reaction of the methyl carbons, the rate of reaction of the overall process and hence the rate of production are increased, i.e., the catalyst loading rate (feed per hour per lb. of catalyst) can be increased.

The best results are achieved with the use of both the metal compounds or inhibitors (e.g., lead tetraethyl) and the bromine promoters since the former selectively reduces the activity of the ring carbons to suppress or inhibit the rate of undesired vapor phase oxidation of the ring carbons and the latter selectively increases the activity of the methyl carbons to increase the rate of desired vapor phase oxidation of the alkyl carbons. Accordingly, higher yields and selectivities and higher rates of reaction of the process are achieved than with either one alone.

Furthermore, by the use of the metal inhibitors of the invention with the bromine promoters, the same yields and selectivities can be achieved with a substantially lesser amount of bromine promoter to thereby decrease the cost, since only very small amounts, e.g., .05% based on weight of o-xylene, of the metal inhibitor are necessary to reduce the optimum amount of bromine promoter and the cost of such small amounts, e.g., lead tetraethyl, is far less than the cost of the bromine promoter saved.

Examples of metal compounds which can be used, in addition to lead tetraethyl, are lead tetramethyl, lead tetrapropyl, tin tetraethyl, lead dibutyl dimethyl, tin tetramethyl, bismuth triethyl, selenium diethyl, tellurium diethyl, lead tetraphenyl, lead tetrabenzyl, lead triethyl phenyl, nickel tetracarbonyl, iron pentacarbonyl, iron dicyclopentadienyl, nickel dicyclopentadienyl and manganese methyl cyclopentadienyl tricarbonyl.

Only a trace (e.g., .001% by weight of the o-xylene in the feed) of the metal inhibitor is effective to provide an advantage. The maximum amount is dictated by the fact that it should not exceed an amount which is volatile at reactor conditions and, from a practical standpoint, the maximum amount is dictated by the fact that beyond a certain amount, depending on the particular metal inhibitor used, no substantial additional advantage is achieved so that it is uneconomical to use more. The maximum amount varies depending on the particular metal inhibitor used since some are more effective than others. In certain cases, if too much is used, a non-volatile metal residue may be deposited on the catalyst and may foul the catalyst. Since the metal residues of some of the metal inhibitors, e.g., lead, selenium and tellurium, are more volatile than others, e.g., iron, nickel and manganese, the maximum amount of the former will be greater than the maximum amount of the latter.

The maximum amount depends in some degree to whether or not bromine promoter is used and the amount, since with bromine, metal bromide is formed, e.g., lead bromide, which is relatively volatile, as compared to the metal oxide, and hence is removed from the system in the product gas. Because of this, the amount of the metal inhibitor, e.g., lead tetraethyl, can be increased without harmful results.

Because the metal residues in the reactor of certain of the metals of the inhibitors are substantially less volatile even though they exhibit high ring carbon oxidation inhibiting effect. Although special treatment of the catalyst may be provided to remove these nonvolatile residues retained by the catalyst, this increases the cost of operation.

The maximum amount of inhibitor also depends on reactor conditions since the higher the temperature and the greater the ratio of air to o-xylene, the greater the amount of metal inhibitors and residues which can be volatilized and hence the greater the maximum amount can be. Also, the longer the contact time, the better the chance of more of the residue being volatilized.

With a lead inhibitor, in most cases, it is best not to exceed 0.1% by weight of the o-xylene in the feed to insure against fouling the catalyst. However, aside from the high cost and the fact that this amount is not necessary, the maximum amount may be as high as 1.0% if the reactor conditions are favorable. With selenium and tellurium inhibitors, no residue problem exists.

The maximum amount can be readily ascertained for any particular operating condition by determining by routine analysis the metal content (lead in the case of lead tetraethyl) of the equilibrium catalyst, i.e., when the catalyst has reached equilibrium conditions. Furthermore, it can be readily observed when the equilibrium catalyst loses its activity and/or capacity. When this occurs, this means that there is too much metal inhibitor. A preferred amount in the case of lead inhibitors is between .002 and .08% by weight of the o-xylene.

It has been found that when the amount is increased beyond .05% by weight of the o-xylene in the feed, very little increase in selectivity and yield are achieved. For example, with TEL, when the amount was increased from .05% to .08%, the results achieved were about the same.

From a practical standpoint, it is desirable to use as little as possible.

When the metal inhibitor is used with bromine promoter the amount of bromine promoter can be reduced by more than one half but it is not essential to reduce the amount of bromine promoter. For example, 1% elemental bromine, based on weight of o-xylene feed, will give better results with .05% TEL than 2% elemental bromine without TEL.

The bromine promoter may be elemental bromine, HBr and/or other bromine compounds which are capable of dissociating into elemental bromine or HBr at reactor conditions. Such bromine compounds may be inorganic compounds such as nitrosyl bromide or ammonium bromide or organic bromides such as ethyl and other lower alkyl bromides, benzyl bromide, acetyl bromide, xylyl bromide, ethylene dibromide, carbon tetrabromide, etc. However, it is preferred to use elemental bromine and/or HBr.

The amount of elemental bromine or HBr may range from about 0.1 to 5%, preferably 0.1 to 2.0%, based on weight of o-xylene. However, with the use of the metal inhibitor of this invention, e.g., TEL, excellent results have been achieved with between about 0.25% and 1.0% elemental bromine or HBr. When other bromine compounds are used, additional amounts of combined bromine are usually required. For example, with ethylene dibromide about 6 times as much combined bromine is required as with elemental bromine and/or HBr. The requisite amount of combined bromine in the other bromine compounds will vary between elemental bromine and ethylene dibromide and, in some instances of less preferred bromine compounds, will be greater than in the case of ethylene dibromide.

The reactor temperature may range from about 500° F. or 550° F. to about 738° F. or 755° F. a preferred range is about 620° F.–720° F.

The ratio of air to o-xylene may range from about 7.5/1 to 20/1 but is preferably between about 9/1 and 13/1.

The TEL and bromine promoter may be vaporized or atomized into the warm air at a temperature above the dew point thereof before the air is passed to the reactor but may be added to the o-xylene feed or directly to the reactor bed. They may be vaporized or atomized into nitrogen which is fed into the warm air stream. Preferably the TEL is added to the o-xylene and the bromine promoter to the air.

The o-xylene feed is preferably sprayed into the catalyst bed but it may be vaporized or atomized and then fed into the bed.

The preferred catalyst consists of vanadium oxides fluxed with a compound of $SO_3$ and alkali metal oxide (preferably potassium oxide) in a ratio substantially greater than one in the equilibrium catalyst and supported on a highly porous, particulate silica gel support having a high surface area.

Preferably in the equilibrium catalyst, i.e., after the catalyst system has reached equilibrium conditions, the ratio of $SO_3$ to alkali metal oxide is between about 1.7 and 2.0, the ratio of alkali oxide to vanadium oxides is between about 3.3 and 5.2, the surface area of the silica gel support is between about 400 and 800 m.²/gram, the pore diameter of the support is between about 30 A. and 90 A. and the amount of catalyst is from 30 to 55% of the total weight of the catalyst and support. However, the TEL is effective to increase yield and selectivity without regard to the particular catalyst.

Group I examples

Examples were carried out in a reactor having a fluid bed height of six feet and a diameter of 1.5 inches. The rate of o-xylene feed was 0.018 lb. per pound of supported catalyst per hour.

The equilibrium catalyst had the following composition:

| Components: | Wt. percent |
|---|---|
| $SiO_2$ support (crushed) | [1]62.3 |
| $P_2O_5$ | 2.6 |
| $V_2O_5$ | 8.4 |
| $K_2O$ | 9.9 |
| $SO_3$ | 16.1 |
| $Ag_2O$ | 0.1 |
| $MoO_3$ | 0.6 |

[1] Bulk density (g./cc.)–0.43; surface area (m.²/g.)–650; pore volume (cc./gm.)–0.88; calculated pore diameter (A.)–55).

Air to o-xylene ratios of from 10/1 to 18/1 and a pressure of 2 p.s.i.g. at the reactor exit were used.

Elemental bromine when used was vaporized into dry nitrogen which was added to the compressed air stream (5 p.s.i.g.) which was introduced into the catalyst bed through the grid.

The TEL was added to the o-xylene which was fed into the bed.

The exit gases were analyzed and measured to obtain selectivities, PAA yields and material balances.

The amounts of elemental bromine promoter used in these examples were zero, 0.5% by weight based on o-xylene feed, 1.0%, 1.5% and 2.0%. Runs were run with each of these amounts of bromine without TEL and with an amount of TEL equal to 0.05% by weight of the o-xylene feed (except for the 2.0% bromine). The reaction temperature for each amount of bromine was varied from 755° F. to 665° F., usually in increments of 5° and 10°.

Each selectivity value, after operation at a steady level, i.e., after the system had reached equilibrium, was measured and plotted against temperature for each of the bromine concentrations with and without the TEL at or near its optimum air/o-xylene ratio and the results are shown in FIG. 1. Selectivity is defined as the total mols PAA, phthalide and other intermediate oxidation products capable of conversion to PAA (i.e., in which one or more of the methyl groups have been partially or wholly oxidized but not removed from the o-xylene ring but in which the o-xylene ring remains intact), divided by mols of o-xylene converted. As aforesaid, this is a measure of the selectivity of oxidation of the methyl groups to PAA, or precursors of PAA, as distinguished from oxidation and cracking of the ring carbons to such products as CO, $CO_2$ and maleic anhydride.

Figure 2:
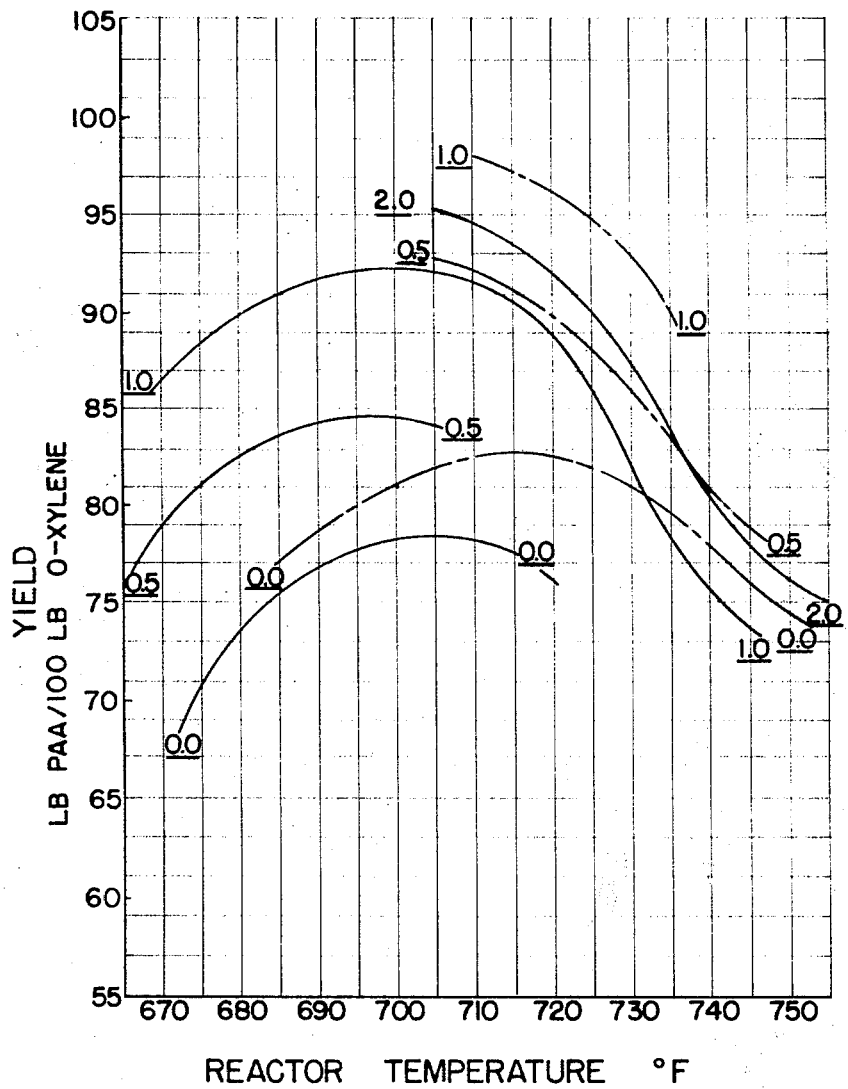

The PAA yields achieved are plotted against temperature in FIG. 2. Yield is defined as lbs. of PAA obtained per 100 lbs. of o-xylene in the feed.

It is apparent from FIGS. 1 and 2, that the use of the very small amount of TEL substantially increased selectivity and yield with and without bromine promoter, especially at higher temperatures. For example, at 720° F. without bromine, the TEL raised the selectivity from about 54 to about 59 and the yield from 76½ to 82½ whereas at 685° F. it raised the selectivity from 55 to 58 and the yield from 76 to 77. At 705° F. with 0.5% bromine, the TEL raised the selectivity from 60½ to 70½ and the yield from 84½ to 92½. This is due to the inhibiting effect of the TEL on the undesired secondary oxidation reaction of the ring carbons. This permitted the use of higher temperatures and consequently the achievement of greater o-xylene conversions at greater rates of reaction and with reduced amounts of phthalide and other partial oxidation products of the methyl carbons. It also permits the achievement of the same selectivity and yield with lesser amounts of bromine.

The catalyst used in these examples was not a particularly good one which limited the maximum selectivity and yield which could be achieved.

Group II examples

Examples were carried out in the same manner as in the Group I examples except that in this case, a commercial plant was used in which the fluid bed height and diameter were 22 and 5¼ feet, respectively, and the fresh catalyst had the following composition:

| | |
|---|---|
| $V_2O_5$ | percent by weight 4 |
| $K_2O$ | do 8.3 |
| $SO_3$ | do 13.8 |
| Silica gel (crushed) | do 73.4 |
| Bulk density | lbs./ft.³ 36 |
| Surface area | m.²/g [1]250–400 |
| Pore volume | cc./g [2]0.45 to 0.60 |

[1] The surface area of the silica gel to which the catalyst was applied was greater than 600 m.²/g.
[2] Pore volume of silica gel to which the catalyst is applied was well above 0.65 cc./g.

The bromine concentration was varied between 0.25% by weight of the o-xylene feed, 0.5%, 1% and 1.7%. Each bromine concentration was used with no TEL and with 0.08% TEL based on weight of o-xylene feed. The air to o-xylene ratio was varied between 10.7/1 and 11.3/1, the temperature ranged between 660 and 695° F. and the rate of production of the crude PAA was 900 lbs./hr.

Figure 3:
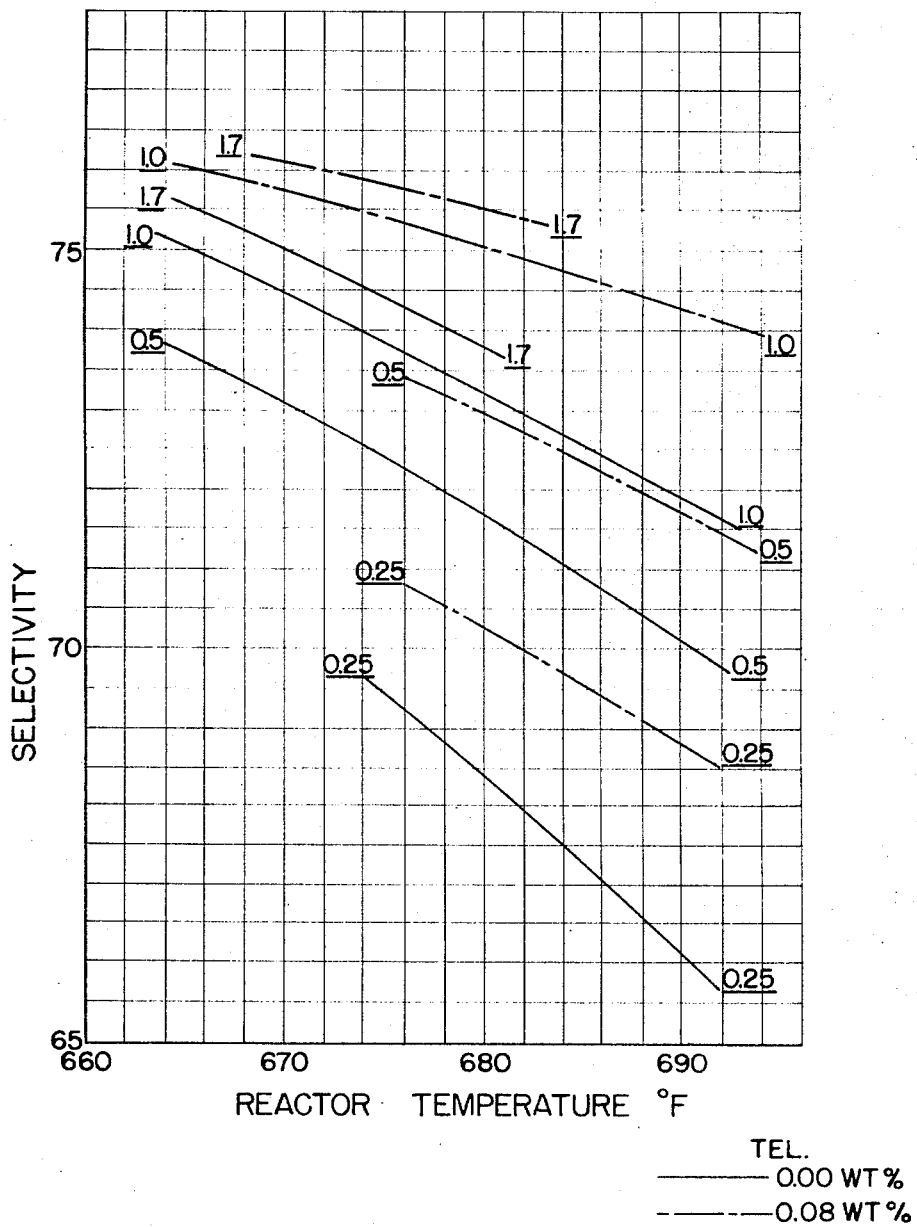
Figure 4:
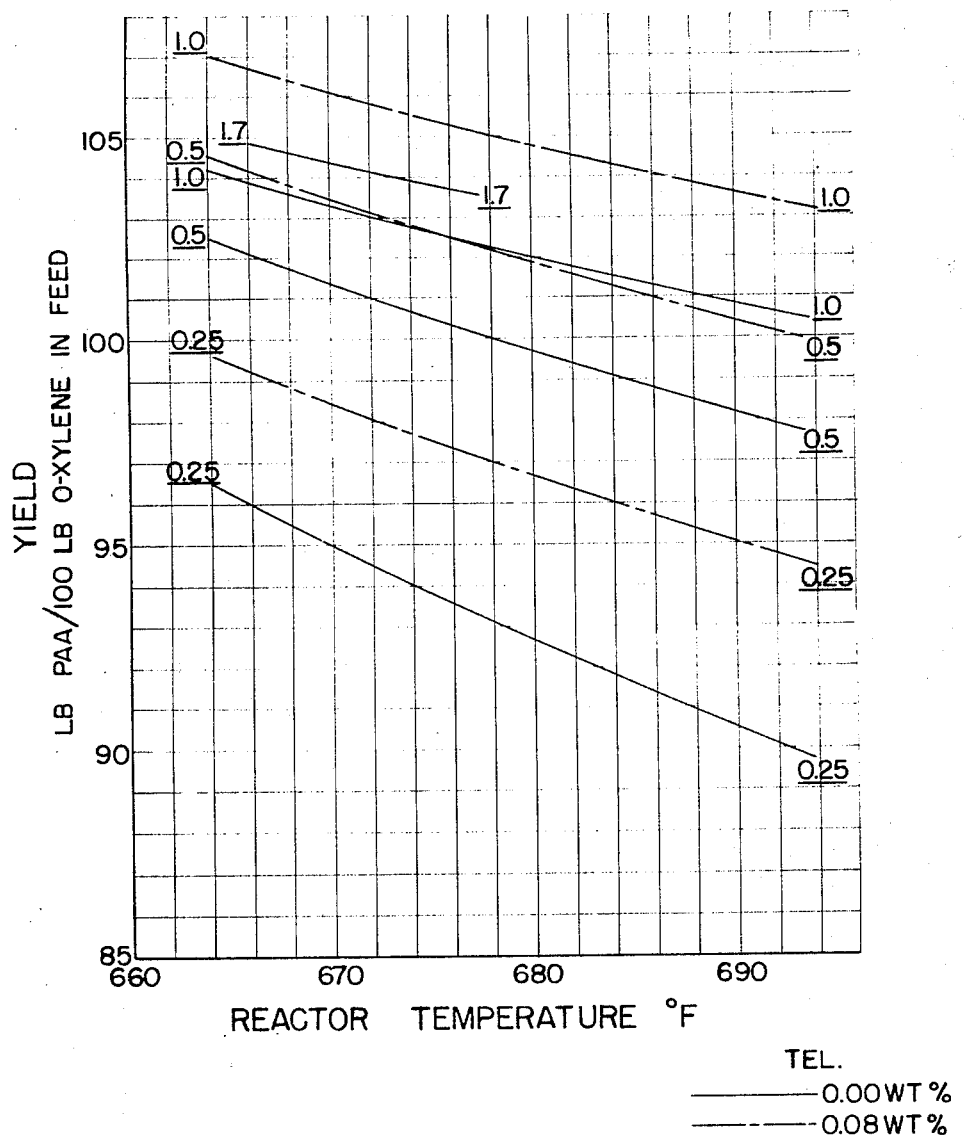

The selectivities and yields achieved are plotted in FIGS. 3 and 4 respectively. This catalyst was a much better catalyst than that used in the Group I examples and, consequently, higher maximum yields and selectivities were achieved.

FIGS. 3 and 4 again demonstrate quite remarkably how only a trace amount of TEL raises substantially selectivity and yield. These figures show more vividly than FIGS. 1 and 2 how selectivity and yield are increased by a greater amount as the temperature is increased because as the temperature is increased, attack on the ring increases without TEL so that the inhibiting effect of the TEL is more pronounced. This permits higher temperatures with greater conversions and greater rates of reaction.

We claim:

1. In a method for the vapor phase, catalytic oxidation of o-xylene to PAA comprising reacting said o-xylene with an oxygen containing gas in a fluidized bed of solid, particulate catalyst to selectively oxidize at the surfaces of said catalyst the methyl groups of said PAA, the improvement comprising carrying out said reaction in the presence in the vapor phase of a vaporized metal polyalkyl, the metal of which is selected from the group consisting of lead, tin, selenium, tellurium and bismuth, and at a temperature of between about 550° F. and 755° F. at which vapor phase oxidation and consequent rupture of the aromatic ring of said o-xylene normally occurs as a competing reaction and at which said metal polyalkyl is decomposed into vaporous organo and metallic fragments, said fragments being effective at said reaction temperature to suppress said competing oxidation and rupture of said aromatic ring.

2. A method according to claim 1, said compound being lead tetraethyl.

3. A method according to claim 1, said reaction also being carried out in the presence in the vapor phase of a promoter of the group consisting of elemental bromine, HBr and a bromine compound which is capable of dissociating into bromine or HBr under reactor conditions, said promoter selectively promoting said oxidation of the methyl groups of said o-xylene and assisting in the removal of said fragments from the reaction zone.

4. A method according to claim 3, said compound being lead tetraethyl and said promoter being either HBr or elemental bromine or both.

5. A method according to claim 1, said catalyst comprising vanadium oxide fluxed with a compound of $SO_3$ and alkali metal oxide in a ratio substantially greater than one and supported on a highly porous silica gel catalyst support of high surface area.

6. A method according to claim 1, the amount of said metal compound being between .001 and 0.1% by weight of the o-xylene feed.

7. A method according to claim 6, said reaction also being carried out in the presence in the vapor phase of a promoter of the group consisting of elemental bromine, HBr and a bromine compound which is capable of dissociating into bromine or HBr under reactor conditions, the amount of said promoter being between about 0.1% and 2% based on the wegiht of o-xylene feed, said promoter promoting said oxidation of the methyl groups of said o-xylene and assisting in the removal of said fragments from the reaction zone.

8. A method according to claim 1, said compound being lead tetraalkyl and said temperature being between about 620° F. and 755° F.

9. A method according to claim 3, said compound being lead tetraalkyl and said temperature being between about 620° F. and 755° F.

References Cited

UNITED STATES PATENTS

| | | | |
|---|---|---|---|
| 2,833,816 | 5/1958 | Saffer et al. | 260—524 |
| 3,170,768 | 2/1965 | Baldwin | 260—524 |
| 2,270,779 | 1/1942 | Berl | 260—346.4 |
| 2,398,281 | 9/1946 | Bartholomew | 49—69 |
| 3,232,955 | 2/1966 | Nonnenmacher et al. | 260—346.4 |
| 2,552,278 | 5/1951 | Hochwalt | 260—524 |
| 3,210,378 | 10/1965 | Nonnenmacher et al. | 260—346.4 |

ALEX MAZEL, Primary Examiner

BERNARD I. DENTZ, Assistant Examiner

U.S. Cl. X.R.

260—524